UNITED STATES PATENT OFFICE.

BIRGER FJELD HALVORSEN, OF CHRISTIANIA, NORWAY.

PROCESS OF PRODUCING CONCENTRATED NITRIC ACID.

No. 892,516.        Specification of Letters Patent.        Patented July 7, 1908.

Application filed February 9, 1906. Serial No. 300,280.

*To all whom it may concern:*

Be it known that I, BIRGER FJELD HALVORSEN, a subject of the King of Norway, residing at Christiania, Norway, have invented certain new and useful Improvements in Processes of Producing Concentrated Nitric Acid; and I do hereby declare the following to be a full, clear, and exact description of the invention, such as will enable others skilled in the art to which it appertains to make and use the same.

My invention relates to the production of nitric acid and the sulfuric acid and consists in an improved method of the production of concentrated nitric and concentrated sulfuric acid from nitroso sulfuric acid or nitrosyl sulfuric acid.

By several chemical processes diluted nitrous gases are obtained for example by the different methods of chemically binding the nitrogen of the air by means of the electric arc. Such nitrous gases, the principal one of which is nitric oxid, may be absorbed by sulfurous acid, in which case nitroso sulfuric acid is obtained or they may be directly absorbed by concentrated sulfuric acid in absorption towers (as in the Gay-Lussac tower used in manufacturing sulfuric acid). It has not hitherto been possible to obtain nitric acid from such nitroso sulfuric acid or from nitrosyl sulfuric acid except by a denitrifying process by which diluted acids are obtained.

The object of my present invention therefore is to produce in an advantageous way concentrated nitric acid and concentrated sulfuric acid from nitroso sulfuric acid or from the nitrosyl sulfuric acid.

My method consists in dissolving the nitrous acid or the nitroso sulfuric acid in a surplus of concentrated sulfuric acid, adding to this solution a small quantity of water, and also a suitable oxidizing agent as for example $MnO_2$, $PbO_2$ or chromic acid or chromates in such quantities as are necessary for the oxidation, which takes place in the following way:

$$3SO_2\genfrac{}{}{0pt}{}{OH}{NO_2}+2CrO_3+H_2O+H_2SO_4=$$
$$Cr_2(SO_4)_3+H_2O+3HNO_3+H_2SO_4$$

The nitric acid obtained may then be distilled off in retorts of cast iron and the oxidizing substance regained by electrolysis. Before the electrolytic process takes place the solution is diluted with water in sufficient quantity necessary for the electrolytic oxidation.

The electrolytic oxidation may for example be effected as follows:

$$Cr_2(SO_4)_3+6H_2O=2CrO_3+3H_2SO_4+3H_2$$

When the oxidizing substance has been regained a certain quantity of the sulfuric acid corresponding to the production is taken away, the rest of the sulfuric acid together with the oxidizing substances being utilized again for the oxidation of another quantity of nitrous acid. The hydrogen obtained may be used in any suitable way or it may be utilized at once in the electrolytic apparatus by introducing into the electrolytic cell for example, salts of copper, in which case electrolytic copper is obtained. The oxidation may also be effected by means of ozone which is led into the nitroso sulfuric solution. It is obvious that also in this case the necessary quantity of water has to be added.

$$3SO_2\genfrac{}{}{0pt}{}{OH}{NO_2}+O_3+3H_2O+(H_2SO_4)=3H_2SO_4+3HNO_3+(H_2SO_4)$$

Peroxid of hydrogen may also be used:
$$SO_2\genfrac{}{}{0pt}{}{OH}{NO_2}+H_2O_2=H_2SO_4+HNO_3$$

When ozone or peroxid of hydrogen are used a regeneration of oxidizing substance will not take place.

I claim.

1. The process which comprises dissolving sulfuric acid containing oxids of nitrogen in sulfuric acid, treating the obtained solution with an oxid of a metal capable of oxidizing the oxids of nitrogen, evaporating the nitric acid formed and regenerating the oxidizing agent by means of electrolysis.

2. The process which comprises dissolving sulfuric acid containing oxids of nitrogen in sulfuric acid, treating the obtained solution with a powerful oxidizing agent, evaporizing the nitric acid formed, regenerating the oxidizing agent by means of electrolysis and simultaneously treating a salt of a metal capable of electrolysis to the electrolyte for the purpose of obtaining a valuable metal on the cathode as a by product by the reducing action of the hydrogen liberated during the recovery of the oxidizing agent.

3. The process which comprises dissolving sulfuric acid containing an oxid of nitrogen in sulfuric acid, treating the solution so obtained with oxid of chromium, evaporating the nitric acid formed, and recovering the oxid of chromium, substantially as described.

In testimony that I claim the foregoing as my invention, I have signed my name in presence of two subscribing witnesses.

BIRGER FJELD HALVORSEN.

Witnesses:
HENRY BORDEWICH,
JOH. VAALER.